United States Patent [19]

Stroup et al.

[11] 4,297,901

[45] Nov. 3, 1981

[54] TONNAGE INDICATOR FOR TOGGLE PRESS

[75] Inventors: John F. Stroup, Cuyahoga Falls; Leonard P. Nypaver, Westlake; Dale S. Eberst, Strongsville, all of Ohio

[73] Assignee: Van Dorn Company, Strongsville, Ohio

[21] Appl. No.: 154,528

[22] Filed: May 29, 1980

[51] Int. Cl.³ .............................................. G01L 5/00
[52] U.S. Cl. ................................ 73/862.53; 73/862.54; 73/862.58
[58] Field of Search ................. 73/133 R, 141 R, 770, 73/818, 825

[56] References Cited

U.S. PATENT DOCUMENTS

| | | | |
|---|---|---|---|
| 2,924,968 | 2/1960 | Colten et al. | 73/770 |
| 3,101,610 | 8/1963 | Rosander | 73/798 |
| 3,897,680 | 8/1975 | Grundmann et al. | 73/825 X |
| 4,122,704 | 10/1978 | Lutenegger et al. | 73/825 X |

FOREIGN PATENT DOCUMENTS 626368 9/1978 U.S.S.R. ............................ 73/862.54

Primary Examiner—Charles A. Ruehl
Attorney, Agent, or Firm—Pearne, Gordon, Sessions, McCoy & Granger

[57] ABSTRACT

Apparatus is disclosed for indicating the final tonnage produced by a press having a toggle mechanism actuated by a closing means. The apparatus comprises means for measuring the closing force exerted on the toggle mechanism by the closing means, means for detecting the initial peak closing force measured by the measuring means, means for converting the initial peak closing force to a final press tonnage value preferably using a proportional relationship, and means for outputting the final press tonnage value. In addition, the apparatus may include switch means for disconnecting the measuring means from the detecting means after the detecting means has detected the initial peak closing force. The apparatus is easily adaptable to most presses having toggle mechanisms such as those used in injection molding machines, and may be used to provide an accurate tonnage indication without the necessity of directly measuring tonnage such as by mounting strain gages on the tie bars.

21 Claims, 3 Drawing Figures

TONNAGE INDICATOR FOR TOGGLE PRESS

BACKGROUND OF THE INVENTION

1. Field of the Invention

This invention relates to presses of the type which use a toggle mechanism to obtain a clamping force and which use a hydraulic system to actuate the toggle mechanism, and particularly to means for indicating the loading pressure of such presses. While this invention may relate to various types of toggle presses used in a wide variety of applications, the invention has special utility in apparatus for the manufacture of plastic articles, such as injection molding machines, and it will be described in the context of such machines.

2. Description of the Prior Art

In plastic injection molding machines, various types of apparatus are used for clamping the mold together during the injection molding process. Among these types of apparatus are hydraulically actuated toggle mechanisms. Such toggle mechanisms provide a mechanical advantage allowing the use of a hydraulic system having a smaller capacity pump than the hydraulic systems used in a press which is closed directly by a hydraulic cylinder. Toggle mechanisms also provide positive lock capabilities. The injection force is absorbed by the linkage system of the press rather than directly by the hydraulic cylinder, and no hydraulic pressure is required in the clamp cylinder, so that the same hydraulic pumps can be used for both the injection cylinders and the clamp cylinders.

In the injection molding process, plastic material, usually in pellet form, is heated in an injection chamber until it reaches a viscous state in which it can be forced to flow into the mold cavities. The press which is used to close the mold halves and clamp the mold together must provide sufficient force or tonnage to prevent the fluid plastic moving at high pressures from forcing the mold halves apart. If the mating surfaces of the mold are forced apart even a few thousandths of an inch, fluid plastic will flow or flash across the mating area. The amount of clamping force required depends upon the projected area of the molded part. Concern should also be given to the viscosity of the plastic at the final mold fill stage.

The force or tonnage exerted by the press on the mold is extremely important in the injection molding process. The tonnage must exceed the pressure exerted by the plastic to resist separation of the mold and flashing of the material. However, the amount of tonnage exerted by the mold should not be excessively greater than that required to resist separation of the mold halves in order to avoid damage to the mold. In many instances, such as when fragile molds are used, if the tonnage exerted by the press exceeds the structural stability of the mold, the mold may be damaged.

It has proven to be extremely useful in the operation of injection molding machines to measure the final preload force or tonnage applied to the mold by the press. This final tonnage may vary as the press operates due to the heating of the components of the press and due to other factors. The tonnage measurement may be used to adjust the operation of the machine so that the tonnage applied will exceed the force created by the plastic in the mold, and thereby resist mold opening or flashing, but so that the tonnage will not be excessive in order to prevent mold damage or other damage to the apparatus. In addition, the tonnage measurement may be used to adjust the relief valve in the hydraulic supply system. When the hydraulic pressure in the cylinder reaches a maximum value as the mold is fully preloaded, the relief valve could be adjusted downwardly to a lower value to prevent the pressure of the hydraulic fluid in the cylinder and consequently the clamping force from becoming excessive.

In the past, this tonnage has sometimes been measured by mounting a strain gage or transducer on one of the tie bars. The positioning and use of such a transducer have proven to be extremely awkward and unreliable. The placement of the transducer on the tie bar subjects it to being dislodged when the mold is inserted into or removed from the press. In addition, the strain gage is subject to bending action of the tie bar which results in inaccurate readings, since the strain gage does not merely read the tension in the tie bar, but also the bending action.

Apparatus to control the operation of a toggle press is disclosed in U.S. Pat. Nos. 3,642,405 and 3,891,774, both issued to Eggenberger et al. In the apparatus disclosed in these patents, the effective length of the tie bar is changed in order to control the force required to close the press. This force is measured by a dynamometer inserted in the hydraulic feed line to the cylinder. Tonnage is not measured directly in this apparatus, however, and therefore the advantages of measuring the tonnage and providing this measurement to the operator of the machine are not provided. In addition, since the Eggenberger et al. apparatus uses a dynamometer in the hydraulic control line, it assumes a constant clamp closing speed, and therefore is not easily adapted to measure tonnage when the clamp closing speed varies, and thus the speed of the hydraulic fluid in the supply line to the cylinder also varies.

SUMMARY OF THE INVENTION

The apparatus of the present invention provides measurement of the tonnage or clamping force applied by a toggle press such as that used in injection molding machines. The tonnage is measured and indicated directly to the machine operator so that it may be used in the operation of the machine. The present apparatus gives an accurate and easily read tonnage indication for a toggle press mechanism. The apparatus of this invention can be easily adapted for use on any press having a toggle mechanism such as that used for closing two mold parts together to define a mold cavity and can be used on injection molding machines and other similar types of apparatus without major modifications to the apparatus. The tonnage indication is displayed by the invention in an easy-to-read digital form so that it can be easily comprehended by the machine operator and used in the operation and adjustment of the machine. The apparatus of the present invention will display an accurate tonnage reading within the normal range of the machine operation. The readings will not vary significantly even if the clamp closing speed changes within normal variations. In addition to providing an accurate tonnage indication during normal machine operation, the apparatus of the present invention will avoid giving an inaccurate and misleading indication during instances in which the machine is not operating normally, such as if the mold does not close, if mold lockup fails to occur, if the mold does not preload completely, or if an excessive period of time occurs between the commencement of increasing clamping force and the mold lockup.

The tonnage indicator apparatus of the present invention is comprised of a relatively few simple, standard electrical components and is adapted to be connected to the conventional electrical signals provided in the control system of an injection molding machine so that it may be installed simply and economically without major machine modifications.

These and other advantages are provided by the present invention which provides apparatus for indicating the final tonnage produced by a press having a toggle mechanism actuated by a closing means. The apparatus comprises means for measuring the closing force exerted on the toggle mechanism by the closing means. Connected to the measuring means are means for detecting the initial peak closing force measured by the measuring means. The apparatus also comprises means for converting the initial peak closing force to a final press tonnage value preferably using a proportional relationship, and means for outputting the final press tonnage value.

Preferably, the closing means includes a fluid cylinder which pushes against one end of the toggle mechanism to actuate the toggle mechanism, and the means for measuring the closing force comprises means for measuring the hydraulic pressure as the cylinder provides the closing force. This means for measuring the hydraulic pressure may be a pressure transducer inserted in the line supplying hydraulic fluid to the cylinder and measuring the hydraulic pressure in the supply line.

The invention may also include switch means for disconnecting the measuring means from the detecting means after the detecting means has detected the initial peak closing force, so that any further peaks in the force exerted on the toggle mechanism will not be detected by the detecting means.

In accordance with the present invention, it has been determined that the pressure or force exerted to close a toggle mechanism during the clamping operation of the press bears a proportional relationship within the normal range of operation of the press to the final preload force or tonnage produced by the press. In particular, the initial peak force exerted on the toggle mechanism which is achieved immediately before the "toggle over" point is reached bears a proportional relationship to the tonnage produced by the press within this normal range. This proportional relationship holds with reasonable accuracy for a given press design operating with its normal range of mold sizes and speed settings. By measuring the force exerted on the toggle mechanism at this initial peak point, and converting this initial peak force value to a final press tonnage value using this proportional relationship, the final preload tonnage produced by the press may be determined by measuring the closing force exerted on the toggle mechanism. Furthermore, this closing force may be directly measured by sensing the hydraulic pressure in the line which supplies hydraulic fluid to the cylinder which produces the closing force upon the toggle mechanism.

DETAILED DESCRIPTION OF THE PREFERRED EMBODIMENT

Figure 1:
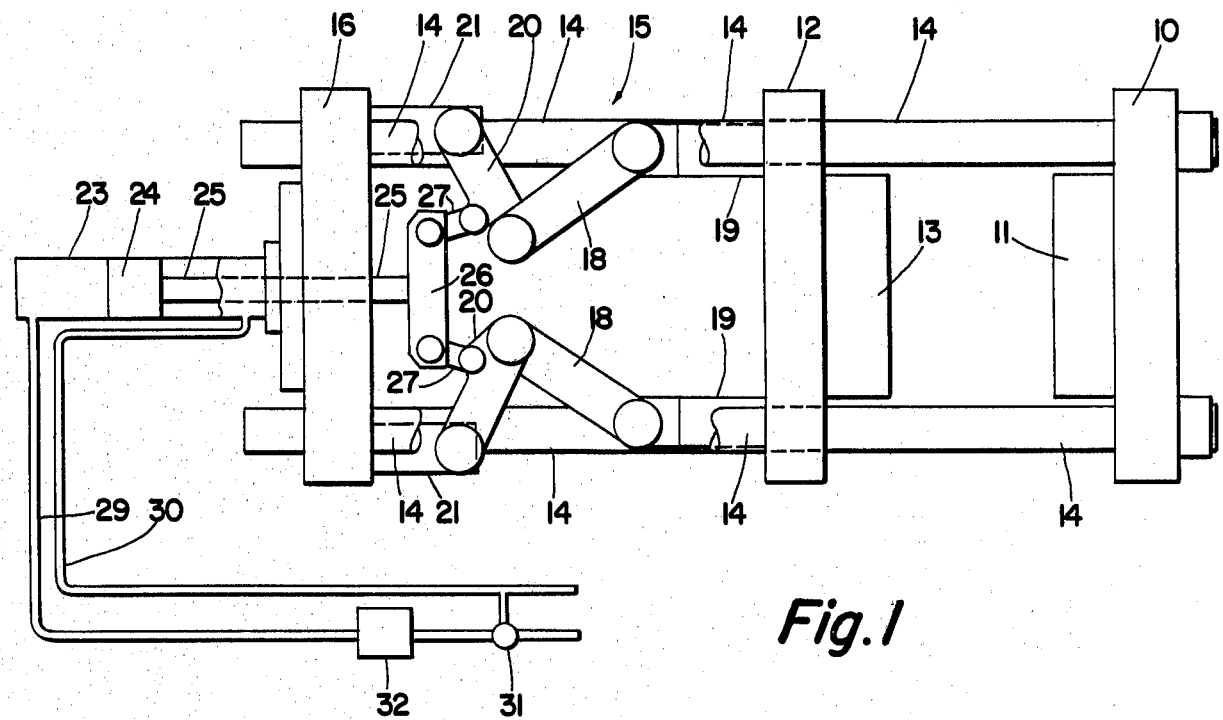
FIG. 1 is a side elevational view, with portions broken away, illustrating a typical press having a toggle mechanism with the force used to close the toggle mechanism produced by a hydraulic cylinder, and showing a portion of the apparatus of the present invention which is used to measure the pressure of the hydraulic fluid in the line supplying fluid to the cylinder.

Referring more particularly to the drawings, and initially to FIG. 1, there is shown a typical injection molding machine of the prior art for which the tonnage indicator of the present invention is adapted for use. The machine comprises a stationary platen 10 supporting a mold half 11 and a movable platen 12 supporting the other mold half 13. The platen 12 is movable with respect to the stationary platen 10 along tie bars 14 which extend perpendicularly from the stationary platen. The movable platen 12 is moved with respect to the stationary platen along the tie bars 14 by a toggle mechanism 15 which extends between the movable platen 12 and a linkage plate 16 mounted on the end of the tie bars 14 opposite the stationary platen 10. The toggle mechanism 15 shown in FIG. 1 comprises a pair of front links 18 connected to ears 19 mounted on the rear side of the movable platen 12, and a pair of rear links 20 connected to ears 21 mounted on the forward end of the linkage plate 16 and each connected to one of the front links 18.

A hydraulic cylinder 23 is mounted on the rear side of the linkage plate 16. The hydraulic cylinder 23 contains a piston 24 having a piston rod 25 which extends through an opening in the linkage plate 16. The forward end of the piston rod 25 is connected to the toggle mechanism 15 by a cross-head 26 mounted on the forward end of the piston rod 25 and connected to the toggle mechanism by cross-head links 27. Hydraulic fluid is supplied to the cylinder 23 behind the piston 24 from a suitable hydraulic supply system (not shown) through a supply line 29 and returned from the forward end of the cylinder in front of the piston through a return line 30. A relief valve 31 may be provided to restrict the flow of hydraulic fluid to the cylinder 23 when a maximum pressure is achieved in order to prevent damage to the mold or to the press due to excessive force exerted by the cylinder. In accordance with the present invention, a transducer 32 is shown in the line 29, as will be described more fully hereinafter.

As hydraulic fluid is supplied to the cylinder 23 through the line 29, the piston 24 is advanced and the piston rod 25 pushes the cross-head 26 forward, actuating the toggle mechanism 15. The movable platen 12 is thus pushed forward along the tie bars 14, closing the mold halves 11 and 13 together.

Figure 2:
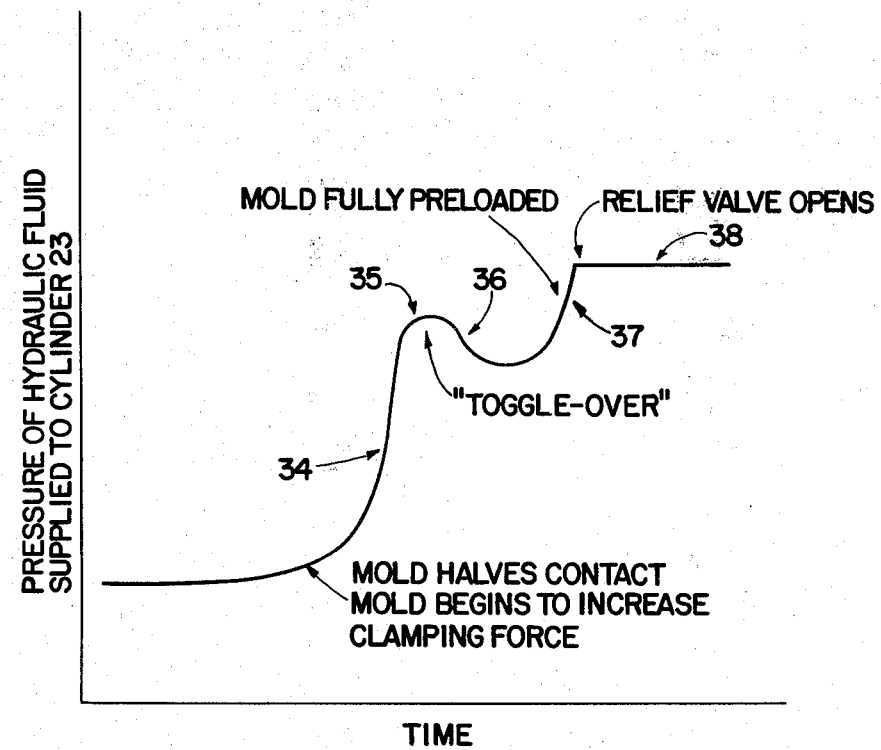
FIG. 2 is a chart indicating the build-up of the hydraulic pressure in the line supplying fluid to the cylinder during the period of time in which the press is fully preloaded and the toggle mechanism is closed.

Referring to FIG. 2, it can be seen that the force required to clamp and fully preload the mold as measured by the pressure of the hydraulic fluid supplied to the cylinder 23 by the line 29 increases as the toggle mechanism 15 is closed. This increase in the supply pressure of the hydraulic fluid is indicated in the curve of FIG. 2 by the curve portion 34. The pressure initially increases when the mold halves 11 and 13 come into contact with each other and the clamping process begins. The pressure continues to increase until it reaches an initial maximum point 35 when the toggle mechanism 15 reaches a "toggle over" point, at which point the increasing mechanical advantage of the toggle mechanism reduces the required pressure. The piston 24 in the cylinder 23 then begins to outrun the fluid supplied to the cylinder as indicated in the curve by the decreasing portion 36. In the portion 37 of the curve, the hydraulic pressure again begins to build behind the cylinder 23 as the cross-head 26 or the piston 24 are stopped from further travel by mechanical stops (not shown). At this stage, the maximum tonnage or preload force exerted by the press is achieved. Thereafter, as indicated by the portion 38 of the curve, the relief valve 30 opens to prevent a further increase in the pressure of the hydraulic fluid, which would result in overloading the hydraulic pumping system.

In accordance with the present invention, it has been determined that the initial peak 35 in the pressure of the hydraulic fluid in the supply line 29 corresponds to the final tonnage load produced on the mold by the toggle press. By measuring the force exerted on the toggle mechanism 15 by the hydraulic cylinder 23, or by measuring the pressure of the fluid in the hydraulic cylinder or of the fluid supplied to the hydraulic cylinder, and by converting this measurement using a known proportional relationship, the tonnage produced by the press may be accurately determined. Therefore, the present invention provides a means for measuring this force or pressure, for detecting the initial peak 35 shown in FIG. 2 when it occurs, converting this initial peak force value to a preload force or tonnage value using the proportional relationship, and outputting this tonnage value in a display suitable for use by the operator of the machine.

Figure 3:
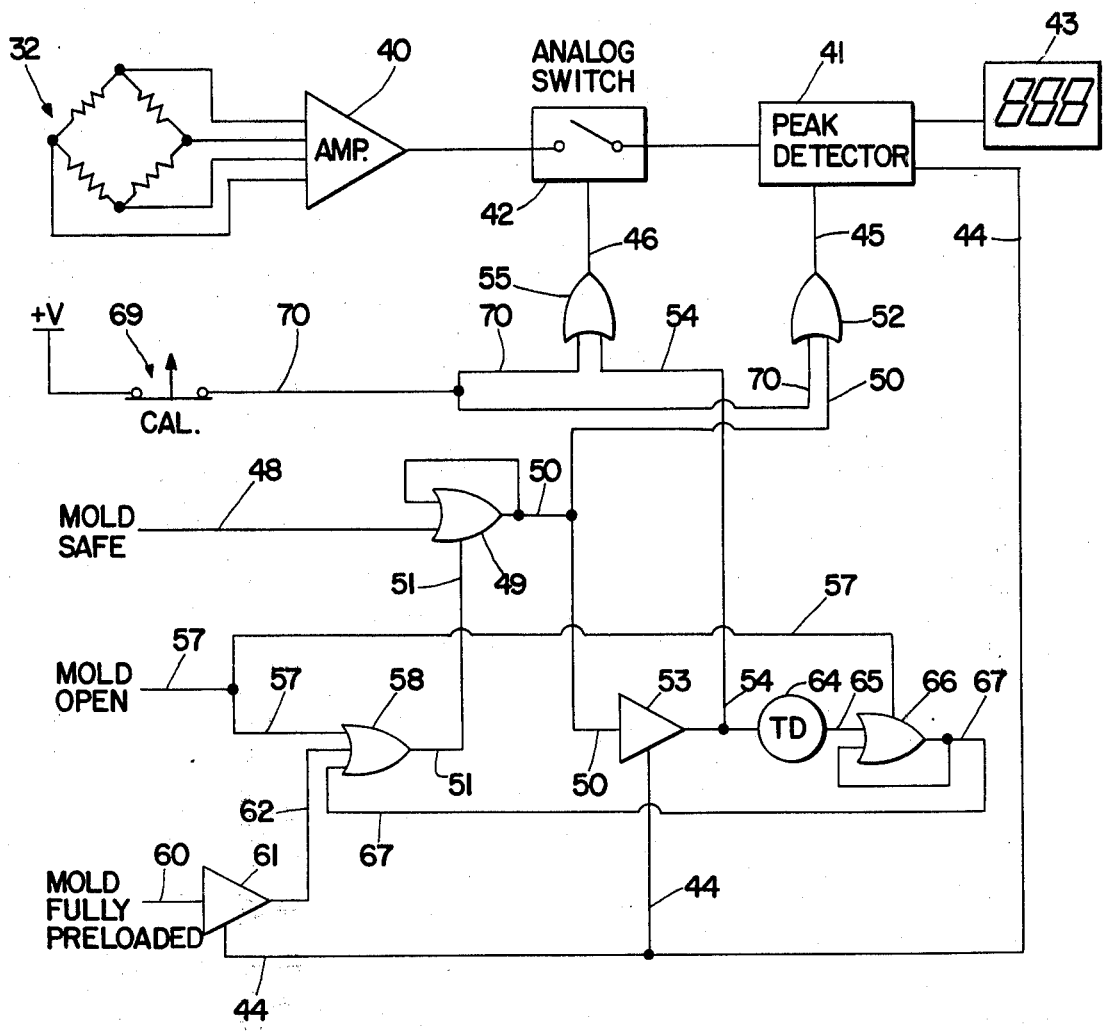
FIG. 3 is a schematic of the apparatus of the present invention which measures the hydraulic pressure and determines and displays the final tonnage produced by the press.

Referring to FIG. 3, there is shown the electrical circuitry which comprises the present invention. The pressure of the hydraulic fluid in the supply line 29 is measured by the hydraulic pressure transducer 32. As shown in FIG. 1, the transducer 32 is mounted in the line 29 through which hydraulic fluid is supplied to the cylinder 23 behind the piston 24. The transducer 32 provides an electrical output which is supplied to a strain gage amplifier 40. The amplifier 40 receives a signal comprising the input voltage from the transducer 32 and amplifies and conditions the signal so that a useful signal may be attained which is suitably proportional to the force exerted on the toggle mechanism. The strain gage amplifier 40 preferably has sufficient adjustment in calibration resistors and means to permit the output of the amplifier to be adjusted so that it attains the proportionality required to read the tonnage directly from the output of the amplifier.

The output of the amplifier 40 is sent to a peak detector unit 41 through an analog switch 42. The peak detector unit 41 is a standard unit which holds and maintains the maximum voltage value received from the amplifier 40 so that the desired initial peak hydraulic pressure sensed by the transducer 32 will be detected. The peak voltage output of the peak detector unit 41 is sent to a display unit 43. The display unit 43 contains an analog-to-digital converter to convert the analog output of the peak detector unit 41 to a decimal digital value, and means for converting this digital value to seven-segment form suitable for a standard digital display. The peak detector unit also has a second status output connected to a line 44. The status output on the line 44 provides a signal which indicates whether a peak has been detected. If the voltage received by the peak detector unit is increasing, indicating that a peak has not yet been detected, the voltage level on the status line 44 is low. When the voltage received by the peak detector unit 41 begins to decrease, the peak detector unit holds and maintains the highest previous voltage value received and supplies this highest value to the display unit 43, and at the same time a status output on the line 44 goes high indicating that a peak has been detected. The operation of the peak detector unit 41 is controlled by an enable input received on a line 45. When the voltage on the line 45 is at a low level, the peak detector unit 41 is disabled and a zero value is supplied to the display unit 43. When the voltage on the line 45 connected to the enable input is at a high level, the peak detector unit 41 is operational and the highest voltage value received by the unit since the enable input went high is supplied to the display unit 43.

The analog switch 42 controls the input to the peak detector unit 41 from the amplifier 40. When the analog switch 42 is opened, the output of the transducer 32 as fed through the amplifier 40 is cut off from the peak detector unit 41. The operation of the analog switch 42 is controlled by the signal on a line 46 connected to the switch. When the voltage on the line 46 is high, the switch 42 is closed, and the output of the amplifier 40 is sent to the peak detector unit 41. When the voltage on the line 46 is low, the switch 42 is opened, and the peak detector unit 41 receives a zero input signal.

The transducer 32, the amplifier 40, the peak detector unit 41, and the analog switch 42 together comprise a circuit for monitoring the initial peak of the pressure in the hydraulic supply line. Activation of this monitoring circuit is begun by receiving a mold-safe signal on a line 48. The mold-safe signal is conventionally provided by the safety system provided on injection molding equipment in order to prevent the initiation of the clamping of the mold until a mold-safe signal is generated indicating that the mold may be safely clamped. When the mold-safe signal is activated, the voltage on the line 48 goes high. The line 48 is connected to the input of an OR gate 49 having its output connected to a line 50. The output of the OR gate 49 is fed back to provide the other input to the OR gate. The OR gate 49 also has an inhibitor input to which a line 51 is connected. When a high-level inhibitor signal is received on the line 51, the output of the OR gate 49 on the line 50 automatically goes low. The output of the OR gate 49 is sent on the line 50 to an OR gate or gate expander 52. The output of the gate expander 52 then forms the enable input to the peak detector unit 41 on the line 45. The output of the OR gate 49 is also sent on the line 50 to a gate 53. The gate 53, similar to the OR gate 49, includes an inhibitor input to which the line 44 is connected. The output of the gate 53 is supplied on a line 54 to a gate expander 55, and the output of the gate expander 55 is connected to the line 46 providing the control input to the analog switch 42.

Thus, when the mold-safe signal is received on the line 48, the voltage on the line 48 goes high, and this high-level signal is fed through the OR gate 49 to provide a high-level signal on the line 50. The high-level signal on the line 50 is fed through the gate 53 and supplied on the line 54 to the gate expander 55 from which the line 46 provides a control signal to the analog switch 42, causing the switch to close, so that the output of the amplifier 40 is sent to the peak detector unit 41. At the same time, the high-level signal on the line 50 is also fed through the gate expander 52 to the line 45 to provide an enable input to the peak detector unit 41 so that the peak detector unit begins sensing the peak output of the amplifier 40. The peak detector unit 41 continues to hold the highest voltage reading received from the amplifier 40 through the closed switch 42.

When the peak voltage is received by the peak detector unit 41, the voltage received by the unit begins to decrease, indicating a decreasing pressure in the hydraulic supply line 29 sensed by the transducer 32 as shown by the decreasing sloping portion 36 in FIG. 2. The peak detector unit 41 holds and maintains the highest value previously received and continues to supply this maximum value to the display unit 43. At the same time, a high-level signal is provided on line 44 which is connected to the status output of the peak detector unit 41. This high-level signal on the line 44 indicates that a peak has been detected by the unit 41 and that the voltage received by the unit is decreasing (meaning that the hydraulic pressure and the force produced by the hydraulic cylinder 23 are decreasing). The line 44 is connected to the inhibitor input of the gate 53. When the high-level signal is provided on the line 44, the output of the gate 53 immediately goes low, and the line 54 which is connected to the output of the gate 53 supplies this low-level signal to the gate expander 55 from which it is fed onto the line 46 to the control input of the analog switch 42, causing the analog switch to open. Thus, hydraulic pressures sensed by the transducer 32 after the initial peak 35 (FIG. 2) has been detected are not provided to the peak detector unit 41. The operation of the monitoring circuit is cut off to prevent the peak detector unit 41 from receiving the higher measurements of the hydraulic pressures which occur after the "toggle over" point during the lockup of the mold, as shown by the portion 37 of the curve of FIG. 2. The peak detector unit 41 will then retain the value at the initial maximum peak 35.

After the molding operation has been completed and the press is opened, the apparatus of the present invention is automatically reset. The reset is initiated by a mold-open signal which is supplied on a line 57. The mold-open signal is conventionally provided by the control system of the injection molding machine and indicates that the movable platen 12 is being retracted and the mold is opening for removal of the items formed in the mold. As the mold is opening, a high-level signal is provided on the line 57. This high-level signal is used as a cancellation signal to disable and reset the monitoring circuit. The line 57 is connected to an input of a gate expander 58, and the output of the gate expander 58 is connected to the inhibitor input of the OR gate 49 by the line 51. Thus, when a high-level mold-open signal is provided on the line 57, indicating that the mold is opening, the high-level signal is fed through the gate expander 58 and forms a high-level cancellation signal on the line 51 which is supplied to the inhibitor input of the OR gate 49. The high-level inhibitor input on the line 51 causes the output of the OR gate 49 to immediately go low, and this low-level signal is sent on the lines 50, 54, and 46 to the analog switch 42, causing the switch to open (if it has not already been opened). The low-level signal is also sent on the lines 50 and 45 to the enable input of the peak detector unit 41, causing the unit to be disabled and causing its output to zero so that it can sense a new peak voltage on the next mold closing cycle.

The apparatus of the present invention also contains the capability of generating a cancellation signal which cuts off the monitoring circuit and halts the tonnage indication if a normal lockup has not been achieved. In one instance, a cancellation signal is generated if no drop in hydraulic pressure has been sensed during the lockup of the press before the mold is fully preloaded. A signal indicating that lockup has occurred is provided on a line 60 from the conventional control system of the injection molding machine. A high-level signal on the line 60 indicates that the mold has been fully preloaded. The line 60 is connected to a gate 61 having an inhibitor input connected to the line 44 which supplies the status signal from the peak detector unit 41. The output of the gate 61 is sent to another input of the gate expander 58 on a line 62. If a peak has been sensed by the peak detector unit 41 before the mold is fully preloaded, a high-level signal will be provided on the line 44 to the inhibitor input of the gate 61, so that the output of the gate 61 on the line 62 will be inhibited and will remain low regardless of the input on the line 60. However, if the mold is fully preloaded before the peak has been detected, a high-level signal will be provided on the line 60 and no inhibitor input will be provided on the line 44 from the peak detector unit 41, so that a high-level signal will be output from gate 61 on the line 62. This high-level signal on the line 62 is fed through the gate expander 58 and on the line 51 forms a cancellation signal which is sent to the inhibitor input of the OR gate 49, causing the output of the OR gate 49 on the line 50 to immediately go low. The low-level signal on the line 50 is sent on the lines 45, 54, and 46 causing the analog switch 42 to open and the peak detector unit 41 to zero, thus halting the operation of the monitoring circuit.

A similar cancellation signal is produced as a result of the operation of a time delay unit 64 which is connected to the line 54. The time delay unit 64 is triggered by the output of the gate 53, so that the unit 64 is initiated by the mold-safe signal (when the signal on the line 48 goes high and the monitoring of the hydraulic pressure is begun), and the time delay unit 64 is reset by a sensed pressure drop (a status signal from the peak detector unit 41 represented by a high-level status signal on the line 44). The duration of the time delay produced by the unit 64 is adjustable and is set so that, if no sensed pressure drop is detected within a predetermined time following initiation of mold clamping as indicated by the mold-safe signal on the line 48, the time delay unit 64 provides a high-level output on its output line 65. The line 65 is connected to the input of an OR gate 66. The output of the OR gate 66 is connected to a line 67 and is fed back to provide the other input to the OR gate 66. The OR gate 66 also has an inhibitor input connected to the line 57 which supplies the mold-open signal, so that a high-level time delay output on the line 65 is inhibited when the mold is opening as indicated by a high-level signal on the line 57. The output of the OR gate 66 is sent on the line 67 to the gate expander 58, which also receives cancellation signals on the lines 57 and 62. Thus, when the time delay unit 64 times out, a high-level signal is sent on the line 65, fed through the OR gate 66, and sent on the line 67 to the gate expander 58 where it is fed through to form a high-level cancellation signal on the line 51. The high-level signal on the line 51 inhibits the OR gate 49, causing the output of the OR gate 49 on the lines 50, 45, and 46 to immediately go low, opening the analog switch 42 and resetting the peak detector unit 41. The time delay unit 64 will time out after the mold has begun to be clamped but is not fully preloaded in the preset time, and when this occurs, the monitoring circuit is cancelled and the signal sent to the display unit 43 is returned to zero.

In order for the apparatus of the present invention to provide an accurate output which represents the tonnage produced by the press, it is necessary that the strain gage amplifier 40 be accurately calibrated. For the purposes of calibration, the amplifier 40 should be provided with a number of calibration adjustments. In addition, the apparatus is provided with a switch 69 which may be actuated while the amplifier 40 is being calibrated. The switch 69 is connected between a voltage source and a line 70, so that, when the switch 69 is actuated, the line 70 is connected to the voltage source to provide a high-level signal on the line. The line 70 is connected to one of the inputs of the gate expanders 52 and 55. When the switch 69 is actuated, the high-level signal provided on the line 70 is fed through the gate expander 55 and sent on the line 46 to the analog switch 42, closing the switch, and the high-level signal on the line 70 is fed through the gate expander 52 and sent on the line 45 to the peak detector unit 41, activating the unit.

The strain gage amplifier 40 is typically provided with five adjustment potentials: coarse gain, fine gain, balance, coarse zero, and fine zero. A calibration resistor may be provided and may be connected to the input of the amplifier 40 for the purpose of calibration of the amplifier. When the calibration resistor is connected to the amplifier, the strain gage amplifier 40 simulates a computed pressure on the pressure transducer 32.

In accordance with the present invention, it has been found that a certain tonnage will be produced by the press when a certain initial peak pressure is produced in the hydraulic supply line 29 to the cylinder 23 which operates the toggle mechanism 15. For example, a 350-ton press will develop 350 tons of force on the mold when an initial peak hydraulic pressure of approximately 1850 psi is achieved. To calibrate the apparatus, the switch 69 is depressed, closing the analog switch 42 and activating the peak detector unit 41, and the strain gage amplifier 40 is connected to a calibration resistor (not shown), which produces a simulated hydraulic pressure. A simulated tonnage is thus calculated by multiplying the press capacity in tons by the simulated pressure produced by the calibration resistor connected to the amplifier, and dividing this result by the value of the initial peak hydraulic pressure which corresponds to the press capacity tonnage. The coarse and fine gain adjustments on the strain gage amplifier 40 are then adjusted until the value shown in the display unit 43 matches this value. The calibration resistor is then disconnected from the strain gage amplifier 40, and with the switch 69 depressed, the zero coarse and fine adjustments are used to adjust the value shown in the output to the display unit 43 so that the value equals 20% of the press capacity in tons. This 20% value is used instead of a true zero based upon test results. By using the 20% value, the hydraulic tonnage indicator follows the actual tonnage of the press more closely in the normal range of operation of the indicator.

Based upon test results of the tonnage indicator of the present invention along with actual measured tonnage produced by the press, it has been found in accordance with the present invention that the initial peak hydraulic pressure in the supply line 29 to the hydraulic cylinder 23 decreases proportionally greater than the actual tonnage produced by the press due to the mechanical advantage of the toggle mechanism. If the initial peak hydraulic pressure is compared to the actual tonnage and then extrapolated down to zero hydraulic pressure, the actual tonnage would cross the zero pressure line at a tonnage value of approximately 20% of the maximum capacity press tonnage. When the tonnage indicator of the present invention is calibrated so that it indicates a reading of 20% of the press capacity at zero hydraulic pressure, the mechanical advantage of the toggle mechanism is accounted for in amplification of the strain gage amplifier 40 and the indicated tonnage matches the actual tonnage within reasonable accuracy.

The tonnage indicator of the present invention is capable of displaying within reasonable accuracy down to about 60% of the press capacity. Below this level, an initial peak in the hydraulic pressure cannot be detected. Referring to FIG. 2, for the tonnage indicator of the present invention to detect the initial hydraulic pressure peak, it must sense the drop in pressure indicated by the curve portion 36. Below approximately 60% of the press capacity, the wave form of a peak at point 35 followed by a decreasing pressure shown as the portion 36 does not occur and accurate tonnage readings are thus no longer possible. It is unlikely that a desired tonnage indication will be required at levels below 60% of the press capacity, so that the linear relationship between the peak hydraulic pressure and the press tonnage holds for the range of interest in measuring tonnage for normal operations.

Normal variations in the clamp closing speed will not affect the tonnage indication of the apparatus of the present invention. If the clamp closing speed is adjusted down below the normal operating speed, the tonnage indication will read about 5% low. This is still normally sufficiently accurate. Moreover, if clamp speed is normally slowed, the calibration can be readjusted to compensate for the lower tonnage reading.

An important aspect of the present invention is the use of essentially linear relationship between the hydraulic pressure in the line 29 which supplies hydraulic fluid to the cylinder 23 which actuates the toggle mechanism 15 and the final tonnage or preload force produced on the mold by the toggle mechanism. The relationship between the hydraulic supply pressure and the press tonnage is proportional for a given combination of toggle clamping mechanism and mold, and within the normal range of tonnages produced by the machine. If the mold is changed or any adjustments on the machine are changed, the linear relationship will no longer strictly hold. However, if any changes are made to the machine, the apparatus can be recalibrated so that the linear relationship can be re-established. Furthermore, variations in this linear relationship are usually quite small, less than 5% for a given mold and within a range of about 10% for a normal range of mold sizes. This accuracy is usually quite adequate for the purposes for which a molder desires the measurement of press tonnage.

Various changes and modifications can be made to the apparatus just described. For example, appropriate electrical circuit means can be incorporated into the circuit already disclosed to refine the linear relationship and to make it more accurate over a greater operational range. For example, circuit means can be incorporated to simulate the nonlinearities which occur in the relationship between the measured hydraulic pressure and the actual machine tonnage. Such circuit means would produce more accurate tonnage readings over a greater range of tonnage than is possible by assuming the linear relationship as is done in the preferred embodiment of the invention. Since the preferred embodiment of the invention already described gives a highly accurate tonnage indication within the normal range of operation of most machines, it is not believed to be necessary to incorporate additional circuit means to follow nonlinear relationship which occurs outside the normal operating range.

It is also possible to incorporate circuit means to compensate for lack of linearity which may occur as a result of varying mold sizes, mold thicknesses, mold heights, and mold widths, and to compensate for other inaccuracies in the display tonnage indication which may occur due to variations in lubrication and resulting friction in the toggle mechanism. Such additional circuitry should not be necessary, since it has been found in accordance with the present invention that the preferred embodiment of this invention will give highly accurate readings for a given combination of mold clamping mechanism settings and molds.

Other variations and modifications are possible. While the invention has been shown and described with respect to a specific embodiment, this is intended for the purpose of illustration rather than limitation, and other variations and modifications of the specific form of the invention shown and described will be apparent to those skilled in the art, all within the intended spirit and scope of the invention. Accordingly, the patent is not to be limited to the specific embodiment shown and described, nor in any other way which is inconsistent with the extent to which the progress in the art has been advanced by this invention.

What is claimed is:

1. Apparatus for indicating the final tonnage produced by a press having a toggle mechanism actuated by a closing means, which comprises:
   means for measuring the closing force exerted on the toggle mechanism by the closing means;
   means connected to the measuring means for detecting the initial peak closing force measured by the measuring means;
   means for converting the initial peak closing force to a final press tonnage value; and
   means for outputting the final press tonnage value.

2. Apparatus as defined in claim 1, comprising in addition switch means for disconnecting the measuring means from the detecting means after the detecting means has detected the initial peak closing force.

3. Apparatus as defined in claim 1, wherein the closing means includes a fluid cylinder containing fluid and the measuring means includes means for measuring the pressure of the fluid.

4. Apparatus as defined in claim 3, wherein the closing means includes a hydraulic cylinder and the measuring means includes means for measuring pressure of the hydraulic fluid supplied to the cylinder.

5. Apparatus as defined in claim 4, wherein the measuring means includes a pressure transducer measuring the hydraulic pressure in the line supplying hydraulic fluid to the cylinder.

6. Apparatus as defined in claim 1, wherein the converting means converts the initial peak closing force to a final press tonnage value using a proportional relationship.

7. Apparatus as defined in claim 1, wherein the outputting means includes means for displaying the final press tonnage value.

8. Apparatus for indicating the final tonnage produced by a press having a toggle mechanism actuated by a cylinder containing fluid, which comprises:
   means for measuring the pressure of the fluid and producing an electrical signal having a first voltage level proportional to the measured pressure;
   means connected to the measuring means for converting the first voltage level representing the measured fluid pressure to a second voltage level;
   means connected to the converting means for detecting an initial peak in the second voltage level representing the final tonnage produced by the press; and
   means connected to the detecting means for outputting the peak in the second voltage level.

9. Apparatus as defined in claim 8, comprising in addition switch means responsive to the detecting means for disconnecting the detecting means from the measuring means in response to the detection of an initial peak in the second voltage level by the detecting means.

10. Apparatus as defined in claim 9, comprising in addition means responsive to an initiation signal for closing the switch means to connect the detecting means to the measuring means and for enabling the detecting means.

11. Apparatus as defined in claim 9, comprising in addition means responsive to a cancellation signal for opening the switch means to disconnect the detecting means from the measuring means and for disabling the detecting means.

12. Apparatus as defined in claim 11, comprising in addition means responsive to a signal indicating that the press has been fully preloaded for producing the cancellation signal in the absence of a peak in the second voltage level sensed by the detecting means.

13. Apparatus as defined in claim 11, comprising in addition time delay means responsive to an initiation signal for producing the cancellation signal in the absence of a peak in the second voltage level sensed by the detecting means within a predetermined time period after the initiation signal.

14. Apparatus as defined in claim 8, wherein the converting means converts the first voltage level to the second voltage level using a proportional relationship.

15. Apparatus as defined in claim 8, wherein the means for detecting an initial peak includes a peak detector circuit.

16. Apparatus as defined in claim 8, wherein the outputting means includes means for digitally displaying the value of the peak in the second voltage level representing the final tonnage produced by the press.

17. Apparatus for indicating the final tonnage produced by a press having a toggle mechanism actuated by a hydraulic cylinder connected to a hydraulic supply system by a hydraulic feed line, the apparatus comprising:
   means for measuring a closing force exerted by the cylinder on the toggle mechanism by measuring the pressure of the fluid in the hydraulic feed line during preloading of the press and for producing an electrical signal having a first voltage level representing the measured pressure;
   amplifier means connected to the measuring means for converting the first voltage level to a second voltage level using a proportional relationship;
   a peak detector circuit connected to the amplifier means for detecting an initial peak closing force by detecting an initial peak in the second voltage level, the peak detector circuit capable of being disabled and reset by receiving a disable signal, the peak detector circuit producing a status signal when the initial peak in the second voltage level has been detected;

switch means connected between the amplifier means and the peak detector circuit for disconnecting the amplifier means from the peak detector circuit in response to a switch control signal;

output display means connected to the peak detector circuit for outputting in digital form the initial peak of the second voltage level representing the final tonnage produced by the press;

means for generating a switch control signal in response to the status signal from the peak detector circuit, so that the peak detector circuit is disconnected from the measuring means after the initial peak in the second voltage level has been detected.

means for deactuating the switch control signal and deactuating the disable signal to close the switch means and enable the peak detector circuit in response to an initiation signal produced when the press is ready to begin preloading;

means for producing a disable signal and for producing a switch control signal to disable and reset the peak detector circuit and to open the switch means in response to a cancellation signal;

first means for producing a cancellation signal in response to an opening signal generated when the press is opening;

second means for generating a cancellation signal in response to a signal indicating that the press has been fully preloaded if a status signal has not been produced and the peak detector circuit has failed to detect a peak in the second voltage level; and time delay means initiated by the initiation signal and reset by the status signal upon detection of a peak in the second voltage level, the time delay producing a cancellation signal if the peak detector circuit has failed to detect a peak in the second voltage level within a predetermined time period after the initiation signal.

18. A method for measuring the final tonnage produced by a press having a toggle mechanism actuated by a closing means, which comprises:

measuring the closing force exerted on the toggle mechanism by the closing means;

detecting an initial peak in the measured closing force;

converting the value of the initial peak in the measured closing force to a final press tonnage value using a proportional relationship.

19. A method as defined in claim 18 in which the closing means includes a fluid cylinder, wherein the closing force is measured by measuring the pressure of the fluid.

20. A method as defined in claim 19, wherein the pressure of the fluid is measured in the line supplying fluid to the cylinder.

21. A method as defined in claim 18, comprising the additional step of calibrating the measured closing force against a known tonnage produced by a press to establish the proportional relationship.

* * * * *